(12) United States Patent
Dougnier et al.

(10) Patent No.: US 9,765,667 B2
(45) Date of Patent: *Sep. 19, 2017

(54) METHOD AND SYSTEM FOR PURIFYING THE EXHAUST GASES OF A COMBUSTION ENGINE

(71) Applicant: PLASTIC OMNIUM ADVANCED INNOVATION AND RESEARCH, Brussels (BE)

(72) Inventors: Francois Dougnier, Hever (BE); Dominique Madoux, Rumes (BE); Beatriz Monge-Bonini, Brussels (BE); Jules-Joseph Van Schaftingen, Wavre (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/101,830

(22) PCT Filed: Dec. 5, 2014

(86) PCT No.: PCT/EP2014/076690
§ 371 (c)(1),
(2) Date: Jun. 3, 2016

(87) PCT Pub. No.: WO2015/082673
PCT Pub. Date: Jun. 11, 2015

(65) Prior Publication Data
US 2016/0319721 A1  Nov. 3, 2016

(30) Foreign Application Priority Data
Dec. 5, 2013  (EP) ..................... 13195921

(51) Int. Cl.
*F01N 3/00* (2006.01)
*F01N 3/20* (2006.01)
(Continued)

(52) U.S. Cl.
CPC ....... *F01N 3/2073* (2013.01); *B01D 53/9431* (2013.01); *F01N 3/206* (2013.01);
(Continued)

(58) Field of Classification Search
CPC ................ F01N 2610/05; F01N 3/208; B01D 2251/2062; B01D 53/9431
(Continued)

(56) References Cited

U.S. PATENT DOCUMENTS

2003/0219371 A1* 11/2003 Amendola ............. B01J 8/0005
60/780
2013/0205757 A1* 8/2013 Boyd ..................... C01C 1/006
60/274
(Continued)

FOREIGN PATENT DOCUMENTS

BE  EP 2975233 A1 *  1/2016  ............ C01B 3/047
DE  44 25 420 A1  7/1995
(Continued)

OTHER PUBLICATIONS

International Search Report issued on May 11, 2016 for PCT/EP2014/076690 filed on Dec. 5, 2014.
(Continued)

*Primary Examiner* — Jason Shanske
(74) *Attorney, Agent, or Firm* — Oblon, McClelland, Maier & Neustadt, L.L.P.

(57) ABSTRACT

A method is provided for loading or reloading a decomposition unit of an SCR system, the SCR system being mounted on board a vehicle and including a filler pipe in communication with the decomposition unit. The method is
(Continued)

such that at least one capsule containing at least one protein component adapted to decompose ammonia precursor is introduced through the filler pipe and is then guided through the filler pipe towards the decomposition unit.

17 Claims, 6 Drawing Sheets

(51) Int. Cl.
  *F01N 9/00* (2006.01)
  *B01D 53/94* (2006.01)
  *F01N 3/24* (2006.01)

(52) U.S. Cl.
  CPC ............ *F01N 3/2066* (2013.01); *F01N 3/24* (2013.01); *F01N 9/00* (2013.01); *B01D 2251/2062* (2013.01); *F01N 2550/05* (2013.01); *F01N 2570/14* (2013.01); *F01N 2610/02* (2013.01); *F01N 2610/12* (2013.01); *F01N 2610/1406* (2013.01); *F01N 2610/1413* (2013.01); *F01N 2900/1811* (2013.01); *Y02T 10/24* (2013.01); *Y02T 10/47* (2013.01)

(58) Field of Classification Search
  USPC .................................................. 60/286, 295
  See application file for complete search history.

(56) References Cited

U.S. PATENT DOCUMENTS

2016/0222853 A1* 8/2016 Dougnier ............... B01D 53/90
2016/0305300 A1* 10/2016 Dougnier ............... F01N 3/2066

FOREIGN PATENT DOCUMENTS

| EP | 2 746 548 A1 | 6/2014 |
| EP | 2 846 011 A1 | 3/2015 |
| WO | 99/56858 A2 | 11/1999 |
| WO | 2007/099372 A1 | 9/2007 |

OTHER PUBLICATIONS

European Search Report issued on Mar. 13, 2014 for EP 13195921.5 filed on Dec. 5, 2013.

* cited by examiner

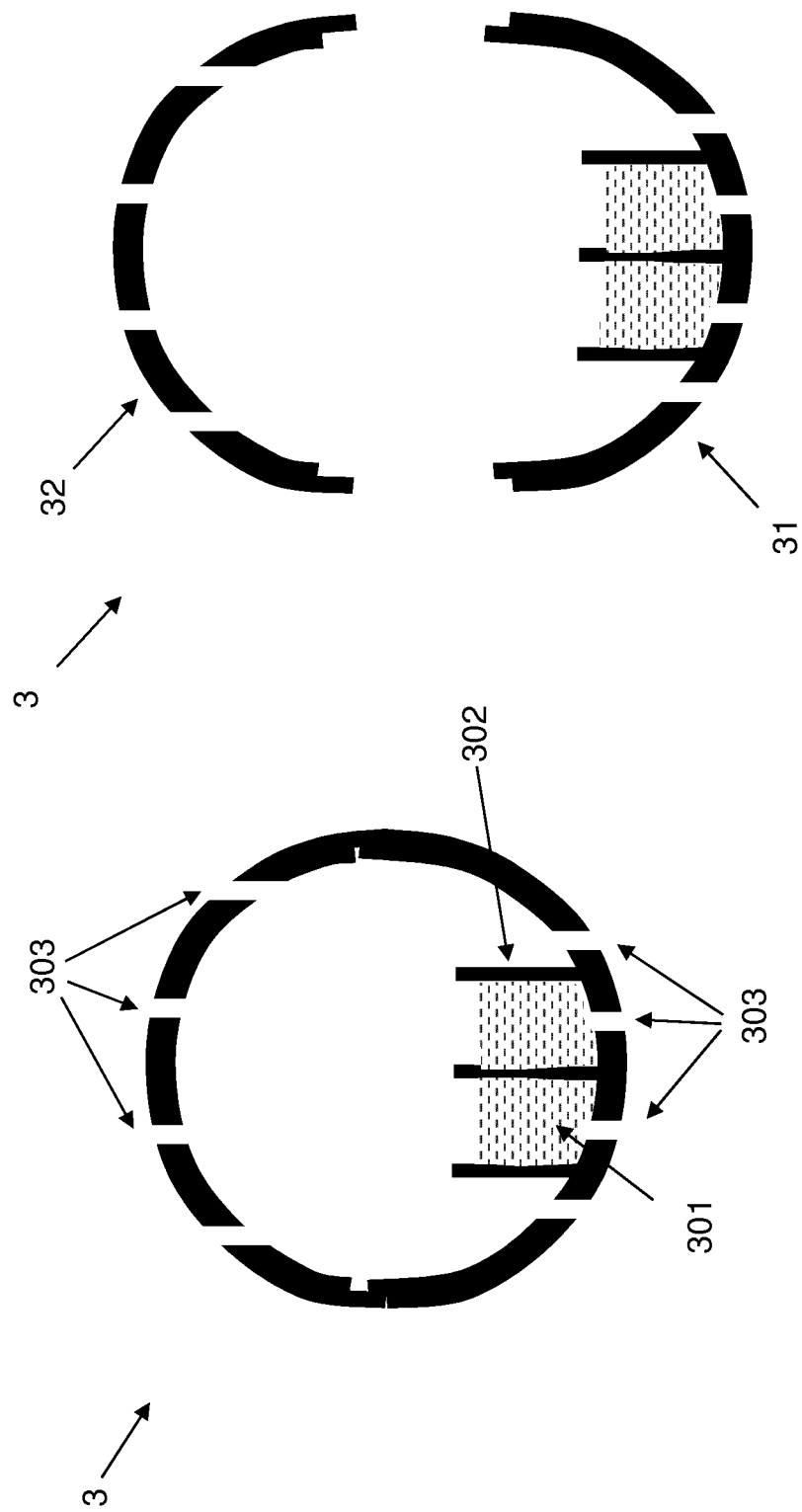

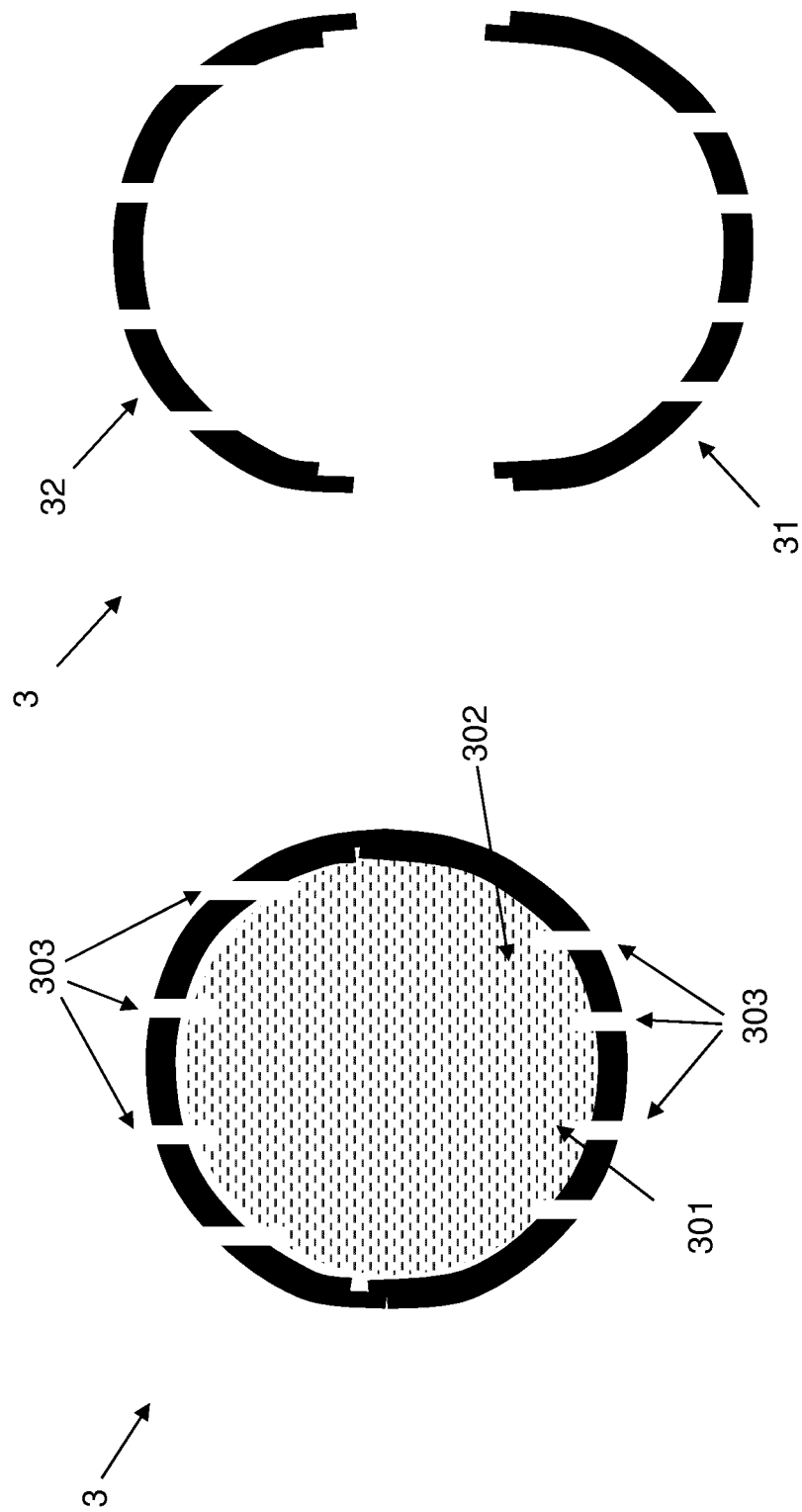

METHOD AND SYSTEM FOR PURIFYING THE EXHAUST GASES OF A COMBUSTION ENGINE

BACKGROUND OF THE INVENTION

The present invention relates to a method and a system for purifying the exhaust gases of a combustion engine of a vehicle (passenger car, light duty vehicle, etc.). In particular it relates to a method and a system for loading or reloading a decomposition unit of a SCR system.

Legislation on vehicle and truck emissions stipulates, amongst other things, a reduction in the release of nitrogen oxides NOx into the atmosphere. One known way to achieve this objective is to use the SCR (Selective Catalytic Reduction) process which enables the reduction of nitrogen oxides by injection of a reducing agent, generally ammonia, into the exhaust line. This ammonia may be obtained by using different techniques.

One known technique is based on the use of an ammonia precursor, for example an aqueous urea solution (eutectic solution of 32.5 wt % urea in water). Generally, such urea solution is stored in a container mounted on the vehicle. The urea solution is injected into the exhaust line, and the gaseous ammonia is derived from the pyrolytic (thermal) decomposition of the injected urea solution. In case of cold start, it is required to be able to operate the SCR system at the end of a predetermined period of time starting from the engine start, this predetermined period of time depending on the ambient temperature. It is generally used a heating device to liquefy the frozen urea solution in freezing conditions. However, even by doing so, it takes a while before enough urea solution is thawed and injected into the exhaust line. On the other hand, in order to avoid deposits in the exhaust pipe, and insure the required chemical reactions aqueous urea solution must not be injected in the exhaust pipe before the exhaust gases have raised the temperature of the exhaust pipe at a sufficient temperature, typically in the 180° C.-200° C. range.

BRIEF DESCRIPTION OF THE DRAWINGS

FIG. 3 is a sectional schematic views of a capsule according to a first particular embodiment of the present invention. In the example of FIG. 3, the capsule is in the form of a ball.

FIG. 4 is a sectional schematic views of a capsule according to a first particular embodiment of the present invention. In this example, the capsule comprises two halve shells [31] and [32] which are injection-molded and which are joined together by clipping.

FIG. 5 is a sectional schematic views of a capsule according to a second particular embodiment of the present invention. In this example, the capsule is completely filled with protein component and immobilized in polymeric support.

FIG. 6 is a sectional schematic views of a capsule according to a second particular embodiment of the present invention.

DETAILED DESCRIPTION OF THE INVENTION

Figure 1:
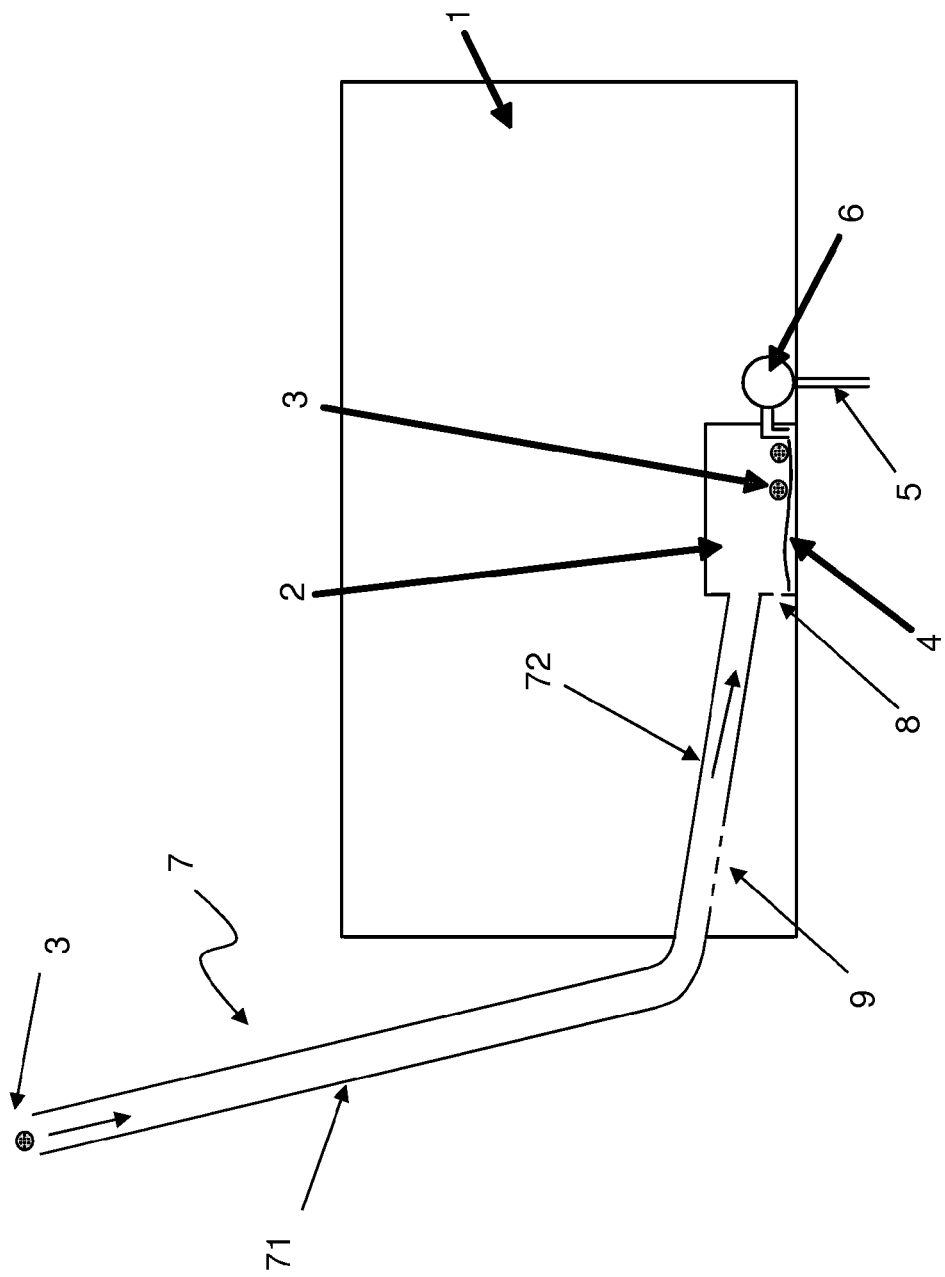
FIG. 1 is a schematic view of a SCR system according to a first particular embodiment of the present invention.

In view of the above-mentioned disadvantages, the Applicant has proposed two new methods for purifying the exhaust gases of a vehicle.

Both methods proposed by the Applicant are based on the use of protein component (or protein sequence) for decomposing an ammonia precursor solution within a biochemical decomposition unit mounted on board the vehicle.

More precisely, according to the first method proposed by the Applicant, the protein component(s) is(are) used to catalyze the hydrolysis (i.e. decomposition) of the ammonia precursor solution (for example, urea) into aqua ammonia. The generated aqua ammonia can be stored and can further be metered in the exhaust gases. Such first method is described in more detail in patent application EP 13182919.4 in the name of the applicant, the content of which is incorporated by reference in the present application.

On the other hand, according to the second method proposed by the Applicant, the protein component(s) is(are) used to catalyze the hydrolysis (i.e. decomposition) of the ammonia precursor solution (for example, urea) into ammonia gas. The generated ammonia gas can be directed (i.e. transmitted) to a solid absorbing matrix where it is stored thereon by sorption. The stored ammonia gas can be released from the solid absorbing matrix and can further be metered in the exhaust gases. Such second method is described in more detail in patent application EP 12199278.8 in the name of the applicant, the content of which is incorporated by reference in the present application.

Generally, protein components have limited life time. With the use of such protein components, new problems have arisen. One of them is how to load protein components or replace consumed protein components in the decomposition unit.

The object of embodiments of the invention is to provide a method for loading or reloading a decomposition unit mounted on board a vehicle, which is practical, rapid and secure.

In accordance with the invention, there is provided a method for loading or reloading a decomposition unit of a SCR or Selective Catalytic Reduction system, the decomposition unit being configured to receive an ammonia precursor (i.e. ammonia precursor can enter in the decomposition unit). The SCR system is mounted on board a vehicle and comprises a filler pipe in communication with the decomposition unit.

According to one aspect of the present invention, at least one capsule containing at least one protein component adapted to decompose the ammonia precursor is introduced through the filler pipe and is then guided through the filler pipe towards the decomposition unit.

Thus, it is proposed an on-board loading or reloading procedure. More precisely, according to the invention the loading or reloading of the decomposition unit is performed when the decomposition unit is mounted on the vehicle and via an interface (i.e. filler pipe) mounted on the vehicle. According to the invention, the filler pipe communicates with the interior of the decomposition unit. In other words, liquids or objects can be introduced inside the decomposition unit via the filler pipe. The filler pipe according to the invention is adapted to cooperate with capsule(s) (or cartridge(s)) containing protein component(s). More precisely, the filler pipe is adapted to receive and transport/guide such capsules towards the decomposition unit. It should be noted that the handling of such capsule is easy and safe. In a preferred embodiment, the capsule may be a hollow body. The capsule can have any form suitable for rolling or sliding in the filler pipe. Advantageously, the capsule can be in the form of a ball, an egg, or a saucer.

Thus, the loading or reloading procedure according to the invention simply consists in introducing the capsule(s) through the filler pipe. Once it is introduced the capsule is automatically guided/transported towards the decomposition unit. Advantageously, the capsule can be transported towards the decomposition unit by gravity. The capsule can slide or roll in the filler pipe. According to the invention, no disassembly manual operations of the decomposition unit are needed for the renewal of the protein components. Thus, the loading or reloading procedure according to the invention is simple, rapid and safe.

In a particular embodiment, the ammonia precursor is an ammonia precursor solution, preferably an aqueous urea solution.

The terms "urea solution" are understood to mean any, generally aqueous, solution containing urea. The invention gives good results with eutectic water/urea solutions for which there is a quality standard: for example, according to the standard ISO 22241, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the AdBlue® solution. The latter have the advantage of only freezing from −30° C. onwards (as opposed to −11° C.), but have the disadvantages of corrosion problems linked to the possible release of formic acid. The invention can also apply to guanidinium formate. The present invention is particularly advantageous in the context of eutectic water/urea solutions, which are widely available in gas stations.

Advantageously, the SCR system comprises a container for the storage of ammonia precursor (for example, a urea tank).

Advantageously, the decomposition unit is located at least partially inside the container and/or on a wall of the container containing the ammonia precursor.

According to a preferred embodiment of the invention, the decomposition unit is entirely located inside the container containing the ammonia precursor. Thus, the safety of the system is increased since, in case of leak of the decomposition unit, the product resulting from the biochemical decomposition of the ammonia precursor (for example, aqua ammonia) can be trapped in the container containing the ammonia precursor (for example, urea).

In a particular embodiment, the filler pipe is mounted on a wall of the container with one portion outside the container and another portion inside the container, the portion of the filler pipe inside the container being connected to the decomposition unit.

The cross section of the filler pipe can have any shape such as circular, elliptical, or rectangular.

According to a first embodiment, the filler pipe can be made of one piece molded plastic.

For example, the filler pipe can be blow-molded in one piece and holes can be drilled along the portion of the filler pipe which will be introduced inside the tank (i.e. container); this can be done for instance by using needles during the blow molding process or by drilling hole after the molding process. The filler pipe can then be partially inserted into a hole drilled in the tank and attached in different ways: for instance, the filler pipe can have an expanded section at the level of the tank wall, allowing its direct welding onto the tank, or its fixation by means of an intermediate part.

According to a second embodiment, the filler pipe can be made of several parts which are assembled. For example, the filler pipe can be composed of two pipes (i.e. hollow tubes) which are interconnected. According to this second embodiment, the pipe outside the container can be rigid and the pipe inside the container can be flexible. This can ease the assembly.

The use of 2 parts gives more design freedom. For example, the pipe inside the container can be injected or blow-molded, whatever is more appropriate, while the pipe outside the container is blow-molded.

Generally, a SCR system comprises a refilling interface comprising an opening which is accessible from the exterior of the vehicle and a urea refill pipe having one end in communication with the opening and another end in communication with the container.

In a particular embodiment, the SCR system can comprise two distinct filler pipes; the existing conventional urea refill pipe leading to the container and the filler pipe according to the invention leading to the decomposition unit.

In a preferred embodiment, the SCR system can comprise the existing conventional urea refill pipe leading to the container and an extension pipe inside the container. The extension pipe has a first end connected to the urea refill pipe and a second end connected to the decomposition unit. Thus, the filler pipe according to the invention can be formed by the combination of the existing conventional urea refill pipe and an extension pipe. Advantageously, in this embodiment the capsules can be inserted in the opening of the refilling interface, and are then guided through the urea refill pipe and the extension pipe towards the decomposition unit. For example, the extension pipe can be inserted into a hole drilled in the container, and the extremity of the extension pipe can then be further inserted into a hole of the decomposition unit so as to insure proper orientation/guidance of the enzymes. The extension pipe position can be insured by the presence of a shoulder at the level of the container hole. The urea refill pipe can then be welded on the container: for example, the urea refill pipe can be fitted with an expanded portion (larger diameter) at the level of the welding path, that allows it to be welded over the shoulder of the extension pipe.

In a preferred embodiment, the SCR system may comprise a single filler pipe adapted to receive and transport (simultaneously or alternatively) both ammonia precursor and capsule(s) containing protein component(s). To this aim, the portion of the filler pipe inside the container comprises at least one through-hole, said through-hole being sized to allow the ammonia precursor to flow in the container. Advantageously, the size of the capsule is larger than the size of said through-hole.

Thus, the filler pipe according to the invention can be used for loading or reloading the decomposition unit with protein component(s) and for filling the container with ammonia precursor, while avoiding entry of protein component(s) (i.e. capsules) inside the container.

In some situations, for example when the vehicle is parked in an inclined position, the introduced capsule can stop or can get stuck somewhere in the filler pipe. Advantageously, the method of the invention comprises a step of introducing ammonia precursor (for example, urea) through the filler pipe so as to push the introduced capsule towards and/or inside the decomposition unit. Thus, the flow of the ammonia precursor in the filler pipe forces the capsule to move towards and/or to enter the decomposition unit. A part of the introduced ammonia precursor can be stored in the decomposition unit, and the rest of the introduced ammonia precursor can flow in the container via the through-holes of the filler pipe. Advantageously, the through-holes are sized so as to avoid spit-back issue.

The capsule according to the invention can be designed so as to either float or sink in the liquid present in the decomposition unit, for instance by using materials with high or low specific mass. Thanks to the hydrodynamic forces of the moving liquid (i.e. introduced ammonia precursor), the buoyancy forces and the reaction forces of the filler pipe and the eventual use of check valve(s) (for example, a flapper door allowing the capsule to flow in one direction only), the capsule can be led practically to any location in the container, for instance at the bottom of the container, or at the top of the container, or along one side, wherever the decomposition unit is best located.

In a particular embodiment, the capsule according to the invention is made of two halve shells which are manufactured as two separate parts which are assembled. For example, the shells can be made by injection moulding a plastic or by compression moulding a plastic. The plastic may be HDPE; alternatively, it may be a polyacetal and, in particular, POM (polyoxymethylene); a polyphtalamide; a polyamide (for example nylon-6,6); or a polyvinyl alcohol.

In an alternative embodiment, the shells or even the whole capsule can be made of degradable (or biodegradable) material. In particular, cellulose-based materials may be used. Thus, after a certain period of time the capsules can automatically disintegrate so as to free space in the decomposition unit.

In an alternative embodiment, the capsules can be filled with pH and ionic strength responsive polymers containing a protein component. For example graft copolymers of polymethacrylic acid-ethylene glycol hydrogel, or any other polymer hydrogel that swells with increasing pH, In an alternative embodiment, the shells can be made of pH responsive material. In contact with urea solution the capsules can swell, release the enzyme and gradually disintegrate.

The capsule according to the invention can store one or several protein component(s) that catalyze a chemical reaction. More precisely, in the particular case where the ammonia precursor is an ammonia precursor solution, the protein component(s) is(are) adapted to catalyze the hydrolysis (i.e. decomposition) of the ammonia precursor solution (for example, urea) into aqua ammonia or into ammonia gas.

Advantageously, the protein component comprises at least one enzyme. In particular, thermostable enzymes are well suited. In a preferred embodiment, the capsule can store urease.

Advantageously, at least one of the shells comprises baffles. These baffles are configured to hold/maintain a substrate onto which the protein component is immobilized. For example, the protein component can be immobilized on a polyamide substrate. In a particular embodiment, both shells are made by injection moulding and integrate (as moulded in one piece with it) the above mentioned baffles.

In a particular embodiment, at least one of the shells comprises at least one orifice through which the ammonia precursor can flow so as to be in contact with the protein component. Thus, decomposition of ammonia precursor can occur when the protein component (for example, urease) is activated. Advantageously, the decomposition unit is equipped with a heater adapted to thermally activate the protein component(s). Such heater can provide the optimum temperature for the desired activity of the enzyme or protein. For example, the heater can be configured to maintain within the decomposition unit a temperature range between 20° C. and 70° C. The heater can either be controlled so as to rise up the temperature within the decomposition unit or controlled so as to cool down the temperature within the decomposition unit. In a particular embodiment, the heater is configured to work within at least one predetermined temperature range corresponding to the activation of the protein component when conversion is needed, and within at least another predetermined temperature range corresponding to the preservation of the protein component, so as to extend its lifetime.

The product resulting from the biochemical decomposition of the ammonia precursor (for example, aqua ammonia) can flow out of the capsule through the orifices so as to be stored in the decomposition unit or in a buffer downstream of the decomposition unit Advantageously, at least one of the shells comprises at least one concave recess and/or at least one protruding part formed in its surface. For example, the capsule may comprise cavities or ribs formed on its external surface. Such cavities or ribs permit to increase the forces resulting from the flow of ammonia precursor solution, and favour the migration of the capsule to the decomposition unit.

The present invention also concerns a SCR system for applying the method as described above, said system comprising:

a decomposition unit for decomposing ammonia precursor, the decomposition unit being configured to receive an ammonia precursor and to receive at least one capsule containing at least one protein component adapted to decompose the ammonia precursor; and a filler pipe in communication with the decomposition unit, the filler pipe being configured to receive and guide the capsule towards the decomposition unit.

In a preferred embodiment, the decomposition unit comprises an inlet through which ammonia precursor solution can enter.

In an advantageous embodiment, the decomposition unit comprises at least one heater adapted to activate the protein component stored in the capsule.

According to a particular embodiment of the invention, the decomposition unit can comprise at least one phase change material, as described in patent application EP 12199278.8 in the name of the applicant, the content of which is incorporated by reference in the present application.

In an advantageous embodiment, the SCR system comprises one pump configured to pump ammonia precursor solution and the product resulting from the biochemical decomposition of the ammonia precursor (for example, aqua ammonia), in an alternate manner, and to transport them to an injector via a feed line.

In an advantageous embodiment, the SCR system comprises a plurality (i.e. at least two) of decomposition units. For example, the SCR system can comprise two decomposition units mounted in parallel and cooperating together according to a predetermined delivery/production scheme. For example, one unit is used to deliver aqua ammonia while the other one is used to produce aqua ammonia (by decomposing the ammonia precursor) for the next vehicle cold start-up. In another example, both units are synchronized, i.e. both units deliver aqua ammonia at the same time and produce aqua ammonia at the same time.

The present invention is illustrated in a non limitative way by the examples below relying on FIGS. 1 to 8 attached. In these figures, identical or similar devices bear identical reference numbers.

FIG. 1 is a schematic view of a SCR system according to a first particular embodiment of the present invention.

As illustrated in the example of FIG. 1, the system comprises:
- a container (i.e. tank) [1] for the storage of an ammonia precursor solution;
- a decomposition unit [2] located inside the tank [1]; and
- a filler pipe [7] in communication with the tank [1] and the decomposition unit [2].

In a particular embodiment, the tank [1] stores an aqueous urea solution, for example AdBlue® solution (commercial solution of urea).

In the example of FIG. 1, the decomposition unit [2] can comprise capsules [3] containing a protein component or a protein sequence. Such protein component acts as a bio-agent. The protein component is adapted to decompose the urea stored in tank [1]. More precisely, the protein component stored in the capsule [3] is adapted to convert the urea into, for example, an ammonia solution (i.e. aqua ammonia). For example, an enzyme, such as urease, can be used to decompose the urea. Of course, other suitable protein sequence can be used. Advantageously, each capsule [3] is introduced through the filler pipe [7]. Once it is introduced the capsule is automatically guided/transported towards the decomposition unit [2]. Advantageously, the capsule can slide or roll down in the filler pipe [7] in the direction indicated by the arrows. In the example of FIG. 1, the filler pipe [7] is a one piece hollow tube. The filler pipe [7] comprises a portion [71] outside the container and a portion [72] inside the container. The portion [72] inside the container comprises through-holes [9]. Advantageously, the size of the capsules is larger than the size of the through-holes. Thus, the capsules can not pass the through-holes and can not fall inside the tank [1]. The through-holes [9] are sized to allow the urea (introduced through the filler pipe [7]) to flow inside the tank [1]. Advantageously, the migration of the capsules [3] to the decomposition unit [2] can be helped by the movement of the urea when it is refilled.

As illustrated, the decomposition unit [2] comprises a heater [4] adapted to thermally activate the protein component stored in the capsules [3]. For example, the heater [4] is activated so as to initiate the decomposition of the urea solution into aqua ammonia. Advantageously, the heater [4] can also be used to defreeze the urea solution or to heat up the ammonia solution, in order to enhance vaporisation in the exhaust line (especially for vehicle key on (i.e. engine start-up) at low temperature).

The system also comprises a pump [6]. This pump [6] is configured to transport the urea or the aqua ammonia (i.e. product resulting from the decomposition) to an injector (not represented) via a feed line [5]. The injector injects the urea or the aqua ammonia in the exhaust gases for NOx removal. In the example of FIG. 1, the pump [6] is connected to a suction point located inside the decomposition unit [2]. For example, in cold conditions, if at vehicle start-up the urea solution (stored in the tank [1]) is not available because it is frozen or if the exhaust temperature is in the 120-180° C. range, then the aqua ammonia stored in the decomposition unit [2] is sucked by the pump [6] and is injected into the exhaust gases. After elapsing of a period of time related to the thawing of the urea solution in tank [1] and/or whenever the temperature of the exhaust is above a given value, for instance 180° C., the urea solution (in liquid state) that enters (via inlet [8]) and flows through the unit [2] is sucked by the pump [6] and is injected into the exhaust gases.

Figure 2:
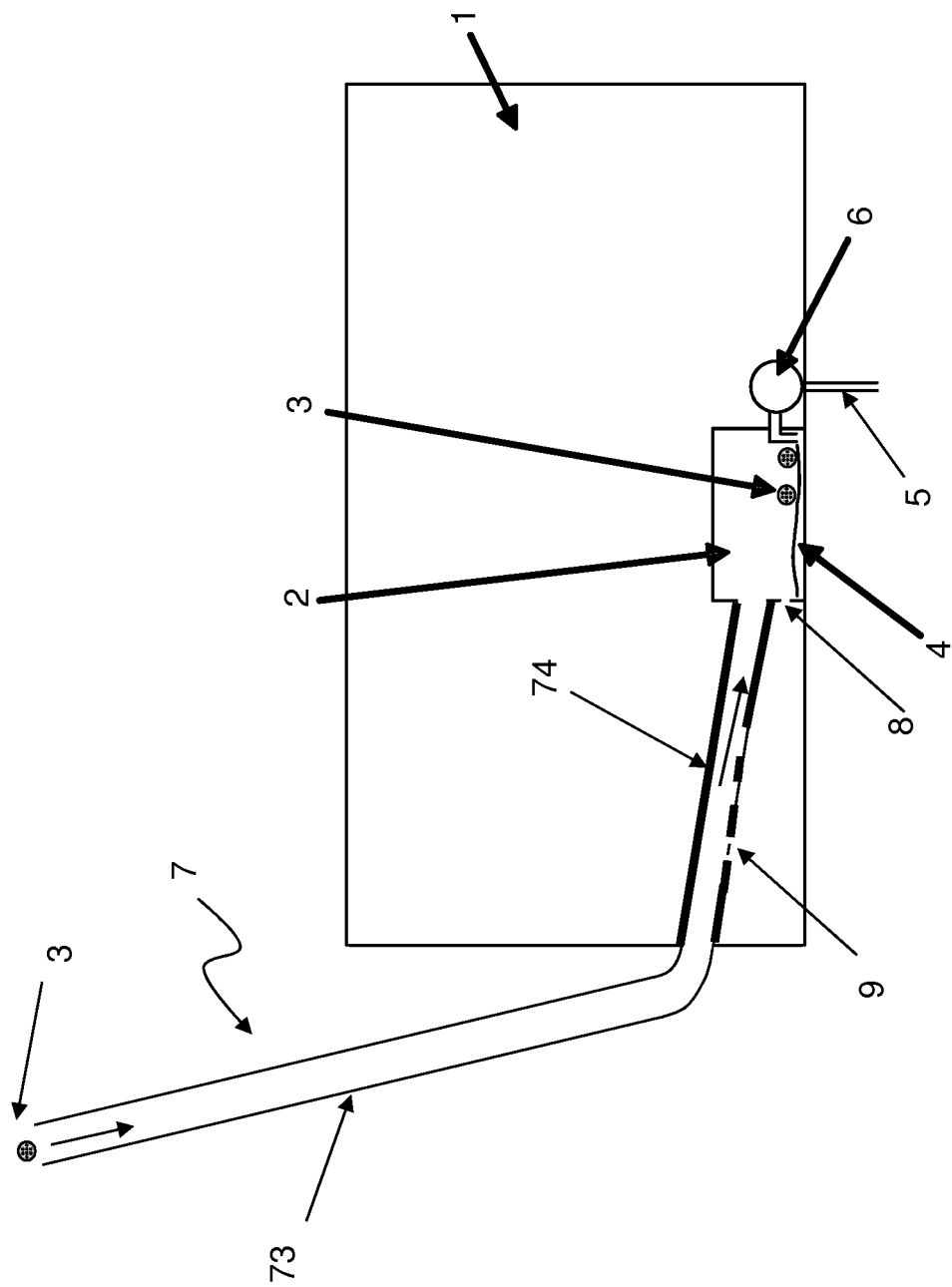
FIG. 2 is a schematic view of a SCR system according to a second particular embodiment of the present invention.

FIG. 2 is a schematic view of a SCR system according to a second particular embodiment of the present invention.

The system of FIG. 2 comprises the following elements (already described above in relation to FIG. 1):
- a container (i.e. tank) [1];
- a decomposition unit [2];
- capsules containing bio-agent [3] (for example, urease);
- a heater [4];
- a pump [6]; and
- a filler pipe [7].

In the example of FIG. 2, the filler pipe [7] is composed of an external pipe [73] and an inner pipe [74]. The external pipe [73] is connected to the tank [1]. The inner pipe [74] has a first end connected to the external pipe [73] and a second end connected to the decomposition unit [2].

FIGS. 3 and 4 are sectional schematic views of a capsule according to a first particular embodiment of the present invention.

In the example of FIG. 3, the capsule is in the form of a ball. For example, the protein component stored in the capsule can be urease. Advantageously, urease can be immobilized on a polyamide substrate and fixed inside the capsule to small baffles [302]. The capsule [3] and the baffles [302] are made out of polyamide, so that the immobilized urease can be attached onto the baffles [302]. Holes [303] in the wall of the capsule allow the ammonia precursor solution (for example, urea) to enter the capsule so that the chemical conversion process can occur.

FIG. 4 shows an example of how the capsule [3] is made. In this example, the capsule comprises two halve shells [31] and [32] which are injection-molded and which are joined together by clipping.

The ball (i.e. capsule) has a diameter compatible with the smallest section of the filler pipe [7], typically between 3 and 24 mm. Diameters of 5 to 18 mm are preferred. Both shells of the ball [3] can contain protein component [301] and baffles [302].

FIGS. 5 and 6 are sectional schematic views of a capsule according to a second particular embodiment of the present invention. In this example, the capsule is completely filled with protein component and immobilized in polymeric support.

At the end of the protein component activity, the ball can be eliminated, through conventional openings or draining means. However a preferred embodiment is to leave the ball in the decomposition unit [2]. For this purpose, the decomposition unit [2] can be sized so that enough space is available to contain the quantity of capsules necessary to cover the whole life of the vehicle.

An alternative embodiment is to use a degradable (or biodegradable) material for the capsule and for immobilizing the protein component or sequence. For example, cellulose-based materials can be used. Thus, after a period of time corresponding to the duration of the activity of the protein component or larger than this duration, the capsule is automatically eliminated (i.e. disintegrated) from the decomposition unit [2].

In a particular embodiment, the shells of the capsule [3] can be compressed rather than injected.

An alternative embodiment is to use pH responsive material for the capsule and for immobilizing the protein component or sequence. For example, pH responsive hydrogels can be used. Thus, in contact with urea solution the capsules can swell, release the enzyme and gradually disintegrate.

Figure 7:
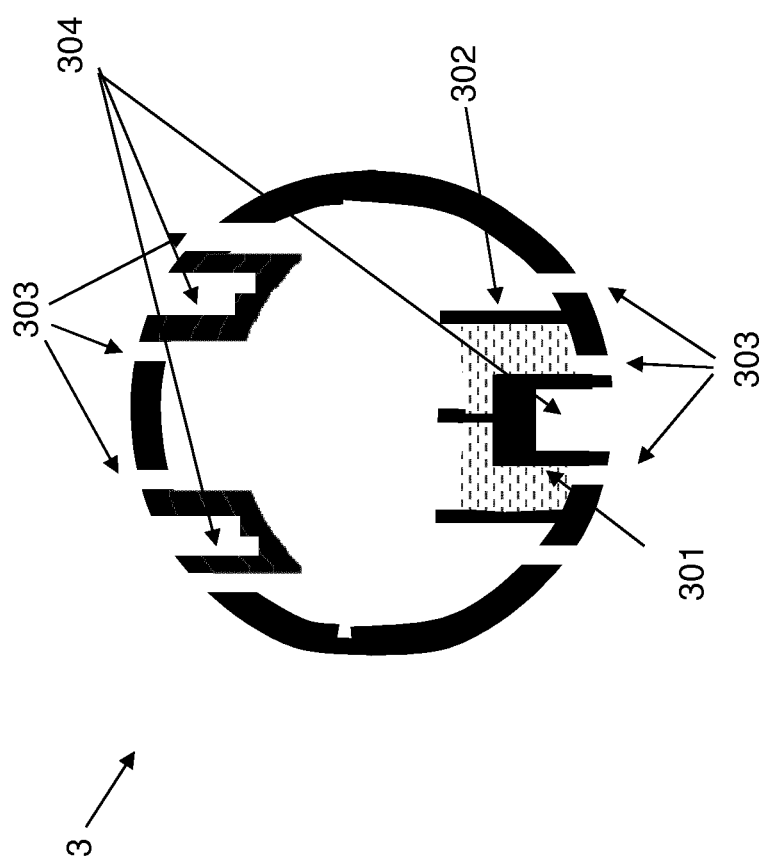
FIG. 7 is a sectional schematic view of a capsule according to a third particular embodiment of the present invention.

FIG. 7 is a sectional schematic view of a capsule according to a third particular embodiment of the present invention. As illustrated, in order to favour the migration of the capsule to the decomposition unit, the capsule can be designed so as to increase the forces resulting from the flow of ammonia precursor solution, for example by forming some cavities [304] at the capsule surface.

Figure 8:
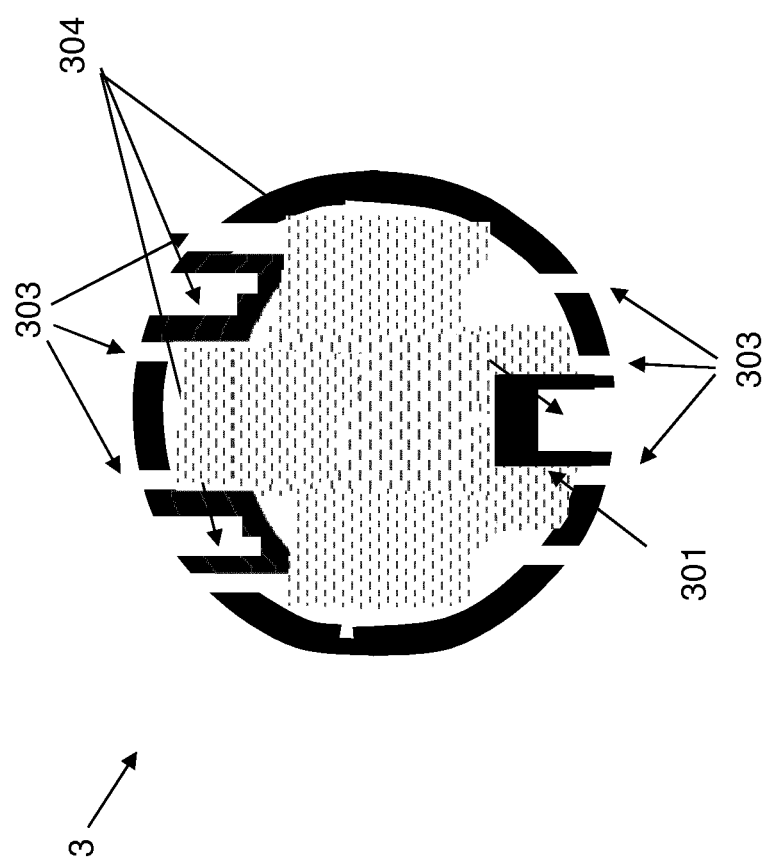
FIG. 8 is another example of a sectional view of a capsule with cavities [304] at the surface. In this example, the capsule is completely filled with protein component and immobilized in polymeric support.

FIG. 8 is another example of a sectional view of a capsule with cavities [304] at the surface. In this example, the capsule is completely filled with protein component and immobilized in polymeric support.

In a particular embodiment, the system can comprise more than two decomposition units. In a particular embodiment, the system can comprise a dedicated filler pipe for each decomposition unit. In another embodiment; the system can comprise one external filler pipe and a plurality of inner pipes, each of them being connected to a decomposition unit. In this later case, a controllable switch or multiplexer circuit can be mounted in-between the external filler pipe and the plurality of inner pipes. The switch can be controlled so as to connect and bring in communication a given inner pipe with the external filler pipe.

The invention claimed is:

1. A method for loading or reloading a decomposition unit of a SCR or Selective Catalytic Reduction system, the decomposition unit being configured to receive an ammonia precursor, the SCR system being mounted on board a vehicle and comprising:
a filler pipe in communication with the decomposition unit,
wherein at least one capsule containing at least one protein component adapted to decompose the ammonia precursor is introduced through the filler pipe and is then guided through the filler pipe towards the decomposition unit.

2. The method according to claim 1, wherein the SCR system comprises a container for the storage of ammonia precursor, and wherein the decomposition unit is located at least partially inside the container and/or on a wall of the container containing the ammonia precursor.

3. The method according to claim 2, wherein the filler pipe is mounted on a wall of the container with one portion outside the container and another portion inside the container, the portion of the filler pipe inside the container being connected to the decomposition unit.

4. The method according to claim 3, wherein the portion of the filler pipe inside the container comprises at least one through-hole, said through-hole being sized to allow the ammonia precursor to flow in the container, and wherein the size of the capsule is larger than the size of said through-hole.

5. The method according to claim 1, wherein ammonia precursor is introduced through the filler pipe so as to push the introduced capsule in the decomposition unit.

6. The method according to claim 1, wherein the capsule is made of two halve shells which are manufactured as two separate parts which are assembled.

7. The method according to claim 6, wherein at least one of the shells comprises baffles configured to hold or maintain a substrate onto which the protein component is immobilized.

8. The method according to claim 6, wherein at least one of the shells comprises at least one orifice through which the ammonia precursor can flow so as to be in contact with the protein component.

9. The method according to claim 6, wherein at least one of the shells comprises at least one concave recess and/or at least one protruding part formed in its surface.

10. An SCR system for applying a method according to claim 1, said SCR system comprising:
a decomposition unit for decomposing ammonia precursor, the decomposition unit being configured to receive an ammonia precursor and to receive at least one capsule containing at least one protein component adapted to decompose the ammonia precursor; and
a filler pipe in communication with the decomposition unit, the filler pipe being configured to receive and guide the capsule towards the decomposition unit.

11. The SCR system according to claim 10, wherein it comprises a container for the storage of ammonia precursor, and wherein the decomposition unit is located at least partially inside the container and/or on a wall of the container containing the ammonia precursor.

12. The SCR system according to claim 11, wherein the filler pipe is mounted on a wall of the container with one portion outside the container and another portion inside the container, the portion of the filler pipe inside the container being connected to the decomposition unit.

13. The SCR system according to claim 12, wherein the portion of the filler pipe inside the container comprises at least one through-hole, said through-hole being sized to allow the ammonia precursor to flow in the container, and wherein the size of the capsule is larger than the size of said through-hole.

14. The SCR system according to claim 10, wherein the capsule is made of two halve shells which are manufactured as two separate parts which are assembled.

15. The SCR system according to claim 14, wherein at least one of the shells comprises baffles configured to hold or maintain a substrate onto which the protein component is immobilized.

16. The SCR system according to claim 14, wherein at least one of the shells comprises at least one orifice through which the ammonia precursor can flow so as to be in contact with the protein component.

17. The SCR system according to claim 14, wherein at least one of the shells comprises at least one concave recess and/or at least one protruding part formed in its surface.

* * * * *